United States Patent [19]

Toti

[11] 4,241,727
[45] Dec. 30, 1980

[54] STRUCTURAL ASSEMBLY, METHOD OF FORMING SAME, AND ELONGATED PANEL STRUCTURE RESULTING THEREFROM

[76] Inventor: Andrew J. Toti, 311 W. River Rd., Modesto, Calif. 95351

[21] Appl. No.: 958,045

[22] Filed: Nov. 6, 1978

[51] Int. Cl.³ .................................................. F24J 3/02
[52] U.S. Cl. .................................... 126/446; 126/449; 29/505; 138/99; 138/156; 24/20 EE
[58] Field of Search ............... 126/446, 447, 448, 449; 165/76, 77; 24/20 CW, 20 EE, 20 W; 138/156, 99; 29/505; 52/282, 288; 403/278

[56] References Cited

U.S. PATENT DOCUMENTS

| | | | |
|---|---|---|---|
| 2,336,139 | 12/1943 | Vogel | 24/20 EE |
| 3,735,465 | 5/1973 | Tibbetts et al. | 165/183 X |
| 4,011,856 | 3/1977 | Gallagher | 165/171 X |
| 4,064,866 | 12/1977 | Knight, Jr. | 126/446 |
| 4,086,913 | 5/1978 | Gavin | 126/446 |
| 4,094,301 | 6/1978 | Sorenson et al. | 165/171 X |
| 4,114,598 | 9/1978 | Van Leeuwen | 126/446 |
| 4,117,832 | 10/1978 | Lupkas | 126/446 |
| 4,131,110 | 12/1978 | Jones, Jr. | 165/171 X |

FOREIGN PATENT DOCUMENTS

| | | | |
|---|---|---|---|
| 2308480 | 8/1974 | Fed. Rep. of Germany | 165/76 |
| 2522154 | 11/1976 | Fed. Rep. of Germany | 126/446 |
| 2613631 | 10/1977 | Fed. Rep. of Germany | 126/446 |
| 2615132 | 10/1977 | Fed. Rep. of Germany | 126/446 |

*Primary Examiner*—Samuel Scott
*Assistant Examiner*—Randall L. Green
*Attorney, Agent, or Firm*—Flehr, Hohbach, Test, Albritton & Herbert

[57] ABSTRACT

A structural assembly comprising a preformed connecting member and a tubular member to be integrally connected in surrounding relationship by said connecting member without requiring separate fastening means for effecting such connection. The structural assembly is particularly well adapted to be joined with similar structural assemblies into an elongated solar energy absorber panel structure. The connecting member and the tubular member are held in virtually inseparable engagement with each other with the connecting member surrounding and generally conforming to the outer peripheral shape of the tubular member by deformable sections of the connecting member which define interengageable locking means comprising strut lock shoulder and tooth sections. Deformation of the shoulder and tooth locking means into progressive contact ensures inseparable connection of the connecting member with the tubular member.

16 Claims, 7 Drawing Figures

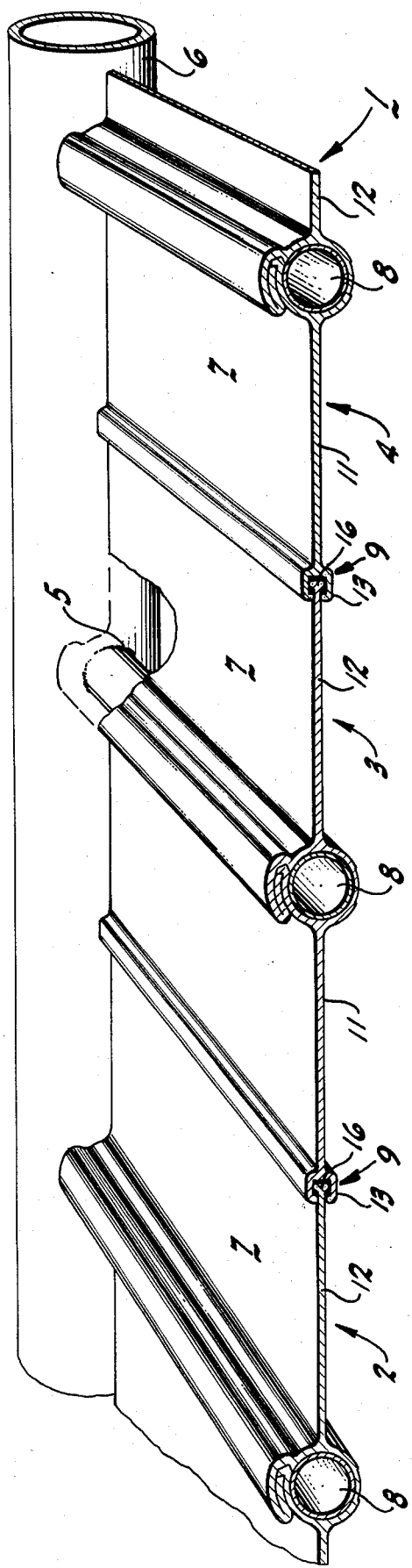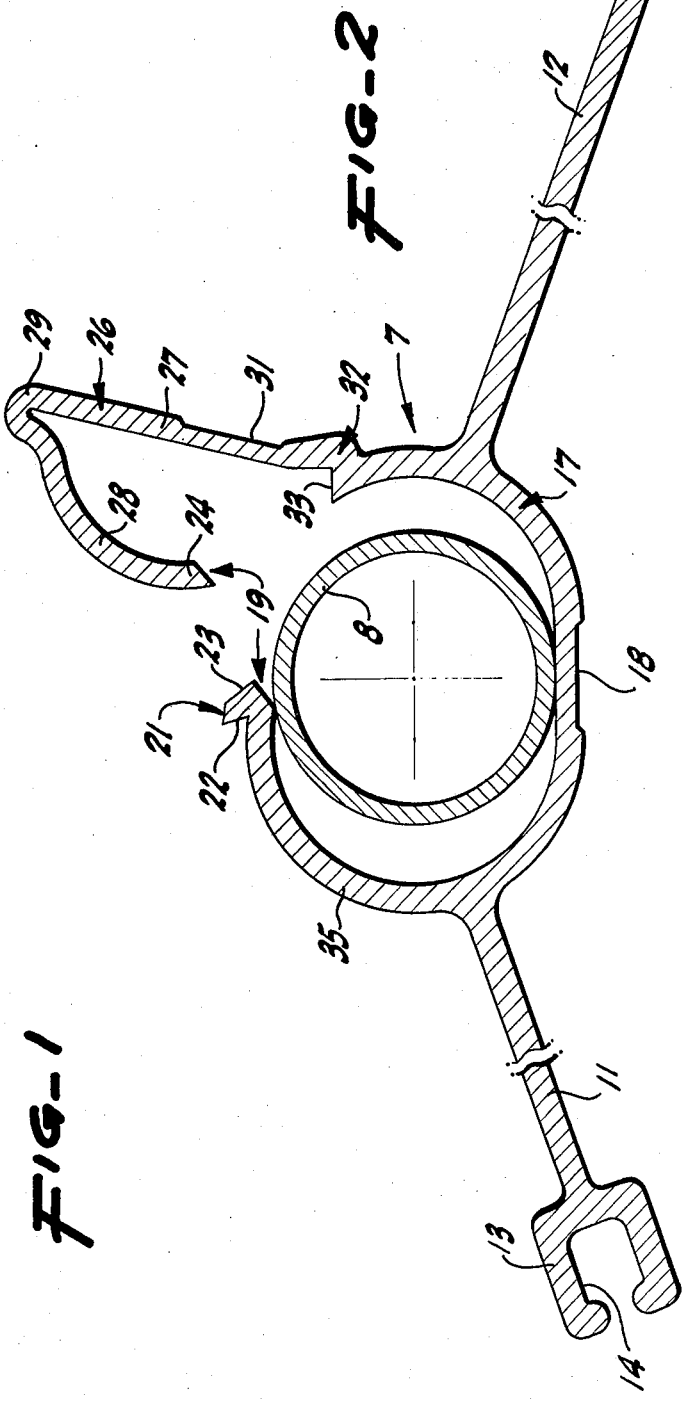

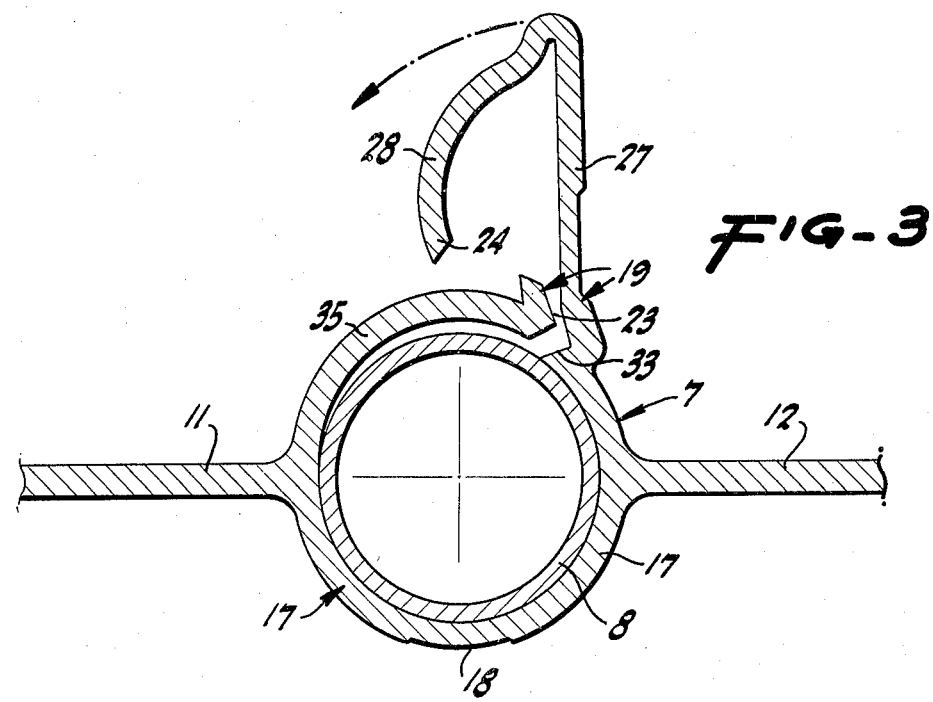
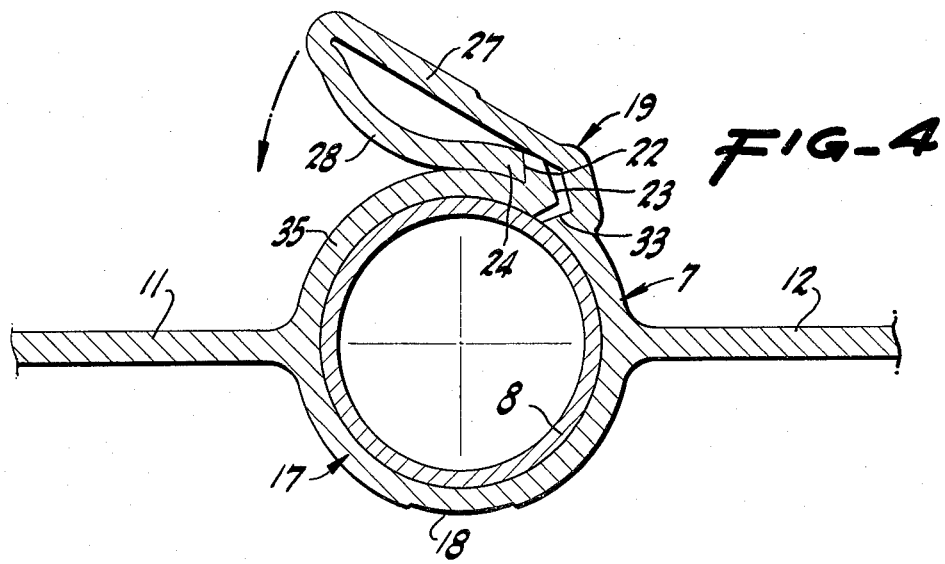
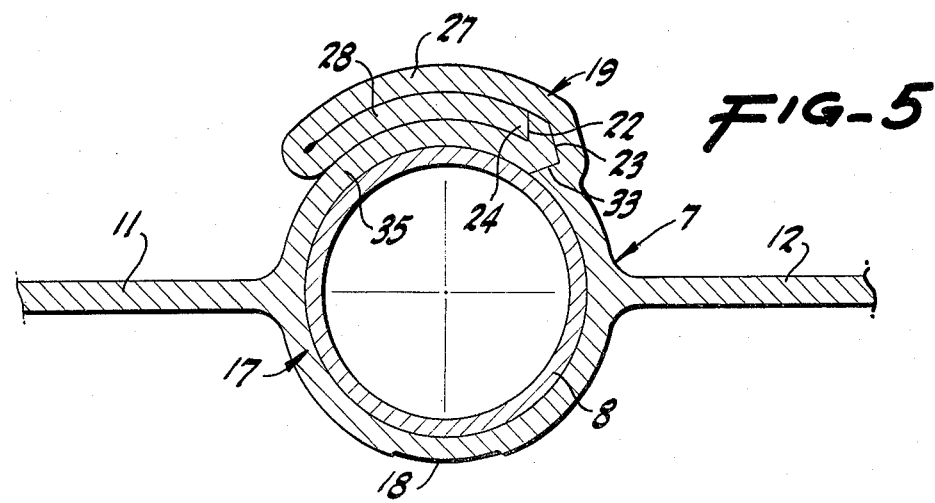

STRUCTURAL ASSEMBLY, METHOD OF FORMING SAME, AND ELONGATED PANEL STRUCTURE RESULTING THEREFROM

FIELD OF THE INVENTION

This invention relates to a structural assembly, and to a method for producing the same. More particularly, this invention relates to an improved structural assembly and an elongated panel structure resulting from interconnecting a plurality of such structural assemblies. Such panel structure has numerous uses, most desirably one in which it serves as a solar energy absorber panel structure.

DESCRIPTION OF THE PRIOR ART

Assembly joints utilizing deformable structural members for securing together one or more other structural members into an integrally connected structure, without requiring separate fastening means to effect such interconnection, such as screws, nuts, bolts, welds and the like, have been known heretofore. One particularly effective structural assembly joint and method for forming the same is illustrated in Applicant's previously issued U.S. Pat. No. 3,741,593 dated June 26, 1973 and entitled "Structural Assembly Joint And Method of Forming Same".

While Applicant's noted patented assembly joint and assembly method is a dramatic improvement over the prior art known theretofore, such patent is directed principally to the interconnection of a preformed connecting member with a panel member, or panel members, to be securely interconnected with the connecting member and with each other. However, Applicant's said patented structural assembly joint and method neither disclose nor contemplate the interconnection of a tubular member with a preformed connecting member to be positioned around and be deformed into peripheral locking contact with the tubular member in the manner disclosed and claimed herein.

Nor does Applicant's prior patent disclose or contemplate a particular shoulder and tooth structure of the type disclosed and claimed herein for securely locking the connecting member in virtually inseparable surrounding locking contact with the tubular member, in the manner and by the procedure disclosed and claimed herein.

In Applicant's prior issued U.S. Pat. No. 3,741,593, other prior art patents also are cited which are related in general terms to the novel structural assembly joint and method of forming the same disclosed and claimed in said patent; however, none of such cited references discloses or contemplates the particular structural assembly disclosed and claimed herein (particularly when such assembly is employed in the production of a solar energy absorber panel structure) in which a preformed connecting member is positioned around and locked in secure interengagement with a tubular member, in the precise manner and fashion claimed herein.

Thus, none of the prior patents referred to above, including those cited in Applicant's prior U.S. Pat. No. 3,741,593, discloses the particular structural assembly, method of forming the same, and an elongated panel structure producible therefrom, of the particular type disclosed and claimed herein, particularly with respect to the production of an elongated solar energy absorber panel structure in which separate structural assemblies of this invention are interconnected with similar structural assemblies similarly constructed to form an elongated panel structure of any predetermined size.

SUMMARY OF THE INVENTION AND ITS OBJECTS

The present invention relates to an improved structural assembly, a structural assembly method, and an elongated panel structure producible from a series of structural assemblies interconnected with each other More particularly, this invention relates to an improved structural assembly defined by a preformed connecting member and tubular member; the connecting member preferably comprises a permanently deformable metal or plastic extrusion, predetermined portions of which are to be deformed into secure locking engagement with each other, to draw the preformed structural member entirely around and into peripheral locking contact with the tubular member positioned within the confines of the connecting member, prior to deforming the connecting member into its locking position around the tubular member.

Still more particularly, this invention relates to an improved structural assembly characterized by an improved structural connecting member which includes an improved shoulder and tooth locking structure, predetermined portions of which are capable of being interconnected with and deformable into locking engagement with each other to draw the connecting member into a closed position surrounding a tubular member to be interconnected with the preformed connecting member, and without utilizing separate fastening means such as screws, bolts, welds, adhesives or the like.

Still more particularly, this invention relates to an improved elongated panel structure producible by utilizing the structural assembly and method of this invention, pursuant to which a series of structural assemblies of the type disclosed and claimed herein are readily interconnected with each other to define an elongated panel structure of any predetermined dimension which has a variety of utilizations, one of which is utilization as a solar energy absorbing plate structure.

From the foregoing, it should be understood that objects of this invention include the provision of an improved structural assembly and method of forming the same; the provision of a structural assembly defined by an improved permanently deformable preformed connecting member and a tubular member to be interconnected therewith without requiring separate fastening means; the provision of an improved panel structure producible from a series of structural assemblies interconnected to define an elongated panel structure of any predetermined length or width; and the provision of an improved structural assembly having particular utility in, and forming part of, a solar energy absorbing panel structure in which the connecting members of the individual structural assemblies serve as solar energy absorbing plates, and in which hollow tubular members integrally connected with the connecting members serve as conduits for fluid to be heated by the solar energy absorbed by the connecting members of the panel structure.

These and other objects of this invention will become apparent from a study of the following detailed disclosure, in which reference is directed to the appended drawings.

BRIEF DESCRIPTION OF THE DRAWINGS

FIG. 1 is a perspective view of an elongated panel structure producible by interconnecting a series of structural assemblies embodying the present invention.

FIG. 2 is an end view of the preformed connecting member of this invention in open position with the tubular member to be interconnected therewith positioned within the open connecting member prior to deformation of the connecting member to surround the tubular member.

FIGS. 3 through 5 are end views showing the sequential deformation procedure utilized for interconnection of the preformed connecting member with the tubular member by deforming the tooth and shoulder structure of the connecting member into strutlike locking engagement about the periphery of the tubular member.

DESCRIPTION OF THE PREFERRED EMBODIMENTS

Figure 6:
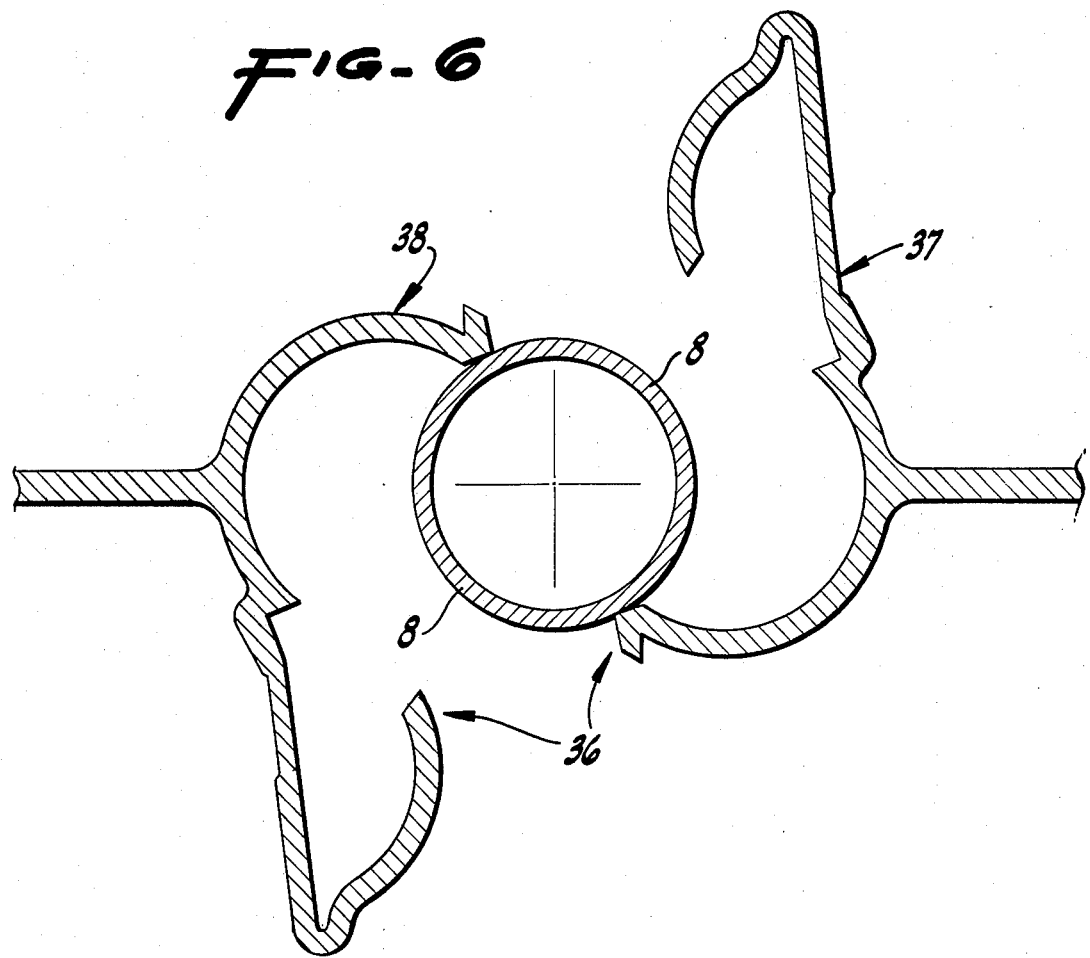
FIG. 6 is an end view of a modified embodiment of the structural assembly in which the connecting member is initially preformed in two separate opposed deformable sections which are substantially identical mirror images of each other.

From the attached drawings it will be noted that the subject invention may take several forms; however, each of such forms employs and utilizes the novel structural assembly, and method of forming the same as disclosed herein. Each embodiment is capable of producing an elongated panel structure having varied and various uses, one preferred utilization of which is to serve as a solar energy absorber panel structure.

The manner in which the components of the structural assembly of this invention are interconnected ensures a secure engagement which positively precludes unauthorized and unwanted disengagement of the respective components of the assembly following their formation into a rigid assembly joint. Additionally, each embodiment of the structural assembly illustrated may be formed, preferably mechanically by utilizing suitable tools (not shown), in a continuous or discontinuous operation as desired to meet a particular need. Thus, wide adaptability and applicability for a wide variety of uses is provided by the subject invention, the preferred utilization of which is as a solar energy panel structure, as described and illustrated herein.

In that latter regard, disclosure hereinafter is made to the utilization of the structural assembly of this invention as part of a solar panel structure; however, it should be understood that such reference hereto is not intended to preclude utilization of the subject structural assembly, and a resulting elongated panel structure utilizing a plurality of such structural assemblies, in other environments and for other purposes. Some other illustrative uses include the manufacture of modular furniture, patio cover and carport roofs, ceilings and walls in mobile homes, and the like, in which it is desirable or necessary to connect generally oppositely extending plate sections with a tubular member, hollow or solid, intended to meet various structural needs.

In the preferred embodiment discussed hereinafter, the tubular member employed is hollow to serve as a fluid conduit for the purpose to be described. Similarly, the connecting member of the structural assembly is defined to include two generally oppositely directed plate sections. While such plate sections in the illustrated embodiment are generally coplanar, it should be understood that such plate sections, depending upon the intended use of the structural assembly being produced, may extend at any predetermined desired angular relationship relative to each other and to the central axis of the connecting member.

It should also be understood that the components of the structural assembly disclosed herein preferably are formed from metal capable of absorbing and conducting heat, because of the desirable utilization of the structural assembly and its various components in a solar energy absorbing panel structure. However, in other utilizations, it may be desirable or preferred to form the connecting member and/or tubular member of the structural assembly from a suitable plastic or non-conducting metal, depending upon the end use intended for the structural assembly.

With such alternative utilizations in mind, reference hereinafter is directed to utilization of the preferred embodiment of this invention in and as part of an elongated solar energy absorbing panel structure of any predetermined size.

Referring first to FIG. 1, a solar energy absorbing panel structure, generally designated 1, is illustrated. That solar panel structure is defined by a series of individual rigidly interconnected structural assemblies of this invention, designated 2, 3 and 4 respectively. As will be described hereinafter, the tubular members which constitute an integral component of each structural assembly 2, 3 and 4, are welded, soldered or otherwise connected by a leak proof joint 5 in known fashion with a manifold pipe 6 which extends in a direction transverse to the plane in which the major portions of the solar panel structure 1 extend. The tubular members of the respective structural assemblies 2, 3 and 4 are received through suitable openings in the manifold pipe 6 and connected therein in leak proof fashion as illustrated in FIg. 1.

The solar panel structure, when the individual structural assemblies 2, 3 and 4 thereof are interconnected in the manner shown with the manifold pipe 6, are to be positioned in a location exposed to the sun so that the panel structure will absorb the energy from the rays of the sun, will transmit such energy in the form of heat laterally of the panel structure to heat fluid passing through the tubular members which serve as conduits for such fluid, and through which such fluid is circulated through the solar panel assembly and the manifold pipe 6 in known fashion. The heated fluid thus produced may be utilized in any fashion well known in conjunction with the solar energy art.

Numerous means for mounting the panel structure in operative position to absorb solar energy may be employed. Because such means are known in the art, and form no part of this invention, no such means is described or illustrated herein.

It should be noted from FIG. 1 that each of the respective structural assemblies 2, 3 and 4 is substantially identical with each other. Each such structural assembly is defined by two principal components, namely, an elongated connecting member 7 preformed into a configuration to be described hereinafter, and an elongated tubular member 8 which, in the solar panel structure embodiment illustrated, is hollow to serve as the conduit for fluid as mentioned previously.

For effective utilization in a solar panel structure, preferably each preformed member 7 is formed from a material which has high solar energy absorbtion characteristics and high heat transmission characteristics—a suitable aluminum or aluminum alloy of the type widely known and commercially available is preferred for that purpose. Preferably each tubular member 8 is formed from a material which also has high heat conducting capability; while a suitable aluminum or aluminum alloy could be utilized, preferably copper tubing is employed because of its rust-resistant capability as well as its desirable heat transmission capability.

As will be described hereinafter, each of the connecting members 7 is provided with means along its opposite marginal edges for permitting rapid, secure and rigid interconnection of one connecting member with an adjacent connecting member. In the illustrated embodiment, such means comprises rib and slot means, generally designated 9 in FIG. 1, of the type to be described.

Although not shown in FIG. 1, it should be understood that, if desired, the surfaces of the connecting members 7 to be positioned toward the sun may be coated with a suitable dark colored energy absorbing paint or similar material to further enhance the energy absorbtion characteristics of the solar panel structure illustrated.

Reference is now directed to FIGS. 2 through 5 for details of construction of the components of the structural assembly of this invention. In the preferred embodiment, such components consist of an elongated preformed structural member 7, and an elongated hollow tubular member 8 to be received within and clamped in secure locking engagement within the confines of connecting member 7. Without intending in any way to limit the inventive concepts disclosed herein, in one preferred embodiment, it has been found desirable to produce the preformed connecting member 7 as an extrusion having a thickness of 0.050 inches in cross-section. Similarly, from one marginal edge to the other, the extrusion is preferably 4.5 inches in width. Its length may vary depending upon the size of the solar panel structure to be produced. The copper tubing preferably utilized is 0.5 inch in outside diameter, with its wall thickness chosen in accordance with the fluid flow rate desired.

Prior to joining the connecting member and the tubular member into an integral structural assembly, the tubular member is inserted, preferably by sliding the same longitudinally into the connecting member when the latter is in its initial generally open position shown in FIG. 2. Although the tubular member 8 is shown in right circular configuration in the embodiment illustrated, it should be understood that other tubular configurations, such as hexagonal or square, also could be utilized if a material is chosen for the connecting member 7 having sufficient distortability to conform to the outer contour of the tubular member employed. However, for obvious reasons, a right circular cylindrical tubular member is more effective as a conduit in a solar panel structure and is more easily interengaged within the confines of the connecting member in secure, virtually inseparable fashion, as shown in FIGS. 2 through 5.

Before describing the manner in which the connecting member is locked in close conforming contact around the tubular member 8, it should be noted that the connecting member is defined by generally oppositely directed plate sections 11 and 12, each of which is slightly less than two inches in width. At their respective marginal edges, the plate sections 11 and 12 are defined with preformed means 9 for interconnecting each connecting member 7 with other similarly constructed connecting members into a panel structure shown in FIG. 1. To that end, the edge margin of plate section 11 is defined by a preformed slot structure 13 having a slot 14 extending preferably the entire length of such edge margin.

The marginal edge of plate section 12 is defined by enlarged rib 16 which extends at least part of, and preferably the entire length of, plate section 12. It will be noted and understood that rib 16 is designed to be received in longitudinally sliding contact within the slot structure 13 of an adjacent connecting member 7 in the manner seen in FIG. 1. When the rib of one connecting member is received within the slot of another connecting member, the rib and slot may be deformed into secure inseparable locking contact with each other by any suitable mechanical means to insure their secure interlock. Thus, when two connecting members are interconnected by a rib and slot joint 9 of the type seen in FIG. 1, an integral solar panel structure is formed pursuant to which heat absorbed from the energy of the sun may be transmitted laterally throughout the full length of the solar panel structure.

Referring to the open configuration of the connecting member 7 shown in FIG. 2, it will be noted that when the connecting member is in the generally open position shown, it has a generally elliptical configuration. However, when the connecting member is fully closed in locking engagement around the tubular member 8, the connecting member is generally cylindrical and the plate sections 11 and 12 thereof extend in generally opposite coplanar relationship with respect to each other.

The connecting member 7, as noted previously, is formed in one piece, preferably as a single extrusion in any predetermined length required to produce a solar panel structure of predetermined size as shown in FIG. 1. A panel structure ten feet in length and four feet in width may readily be produced by interconnecting sufficient individual structural assemblies together in the manner described.

As seen in FIG. 2, each connecting member 7 is defined by a central body section 17 from which the aforementioned plate sections 11 and 12 project generally laterally. The central body section 17 preferably includes a reduced thickness hinge portion 18 which extends for approximately one-quarter inch of the periphery of body section 17 in an area generally centrally located between the plate sections 11 and 12. Such reduced thickness portion serves as a hinge to facilitate distortion and deformation of the connecting member about the tubular member in the manner shown in the drawings.

Opposite the reduced thickness hinge portion 18 of body section 17 is provided means for drawing the body section into a generally peripherally continuous section and to lock the body section securely about the outer periphery of the tubular member 8 in substantially continuous contact with the outer periphery of the tubular member. Such means in the illustrated embodiment comprises an interconnectable shoulder and tooth structure generally designated 19. Structure 19 is defined by a generally reversely directed rigid shoulder section 21 which initially defines one edge of the longitudinal opening which exists between the shoulder and tooth structure 19 prior to interlocking thereof. Shoulder section 21 includes an undercut shoulder portion 22 generally of v-shape in the embodiment shown. Shoulder section 21 also includes a generally v-shaped projecting edge portion 23, the purpose of which will be described later.

The tooth portion of the shoulder and tooth structure 19 is defined by a generally v-shaped marginal edge 24 which forms part of a reversely bent deformable flange 26, as best seen in FIG. 2. The reversely bent flange 26 is defined by a first generally straight section 27 and a second generally curved section 28, the terminus of which is defined by the aforementioned v-shaped tooth portion 24. It will be noted that the tooth 24 is contoured generally in conformance with the configuration of the undercut shoulder portion 22 of shoulder section 21. The two sections 27 and 28 which make up the flange 26 are interconnected with each other by a bent hinge section 29 also as best seen in FIG. 2.

Section 27 of flange 26 preferably is formed with a reduced thickness section 31 which performs the same type of hinge function as the aforementioned reduced section 18 of central body section 17 of the connecting member 7. Flange 26 of the connecting member is integrally connected with the central body section 17 adjacent plate section 12 by means of a hinge section 32, the inner margin of which is defined by an undercut v-shaped internal recess 33 which extends the length of the connecting member 7. Recess 33 is formed to conform to the configuration of the v-shaped edge portion 23 of the shoulder section 21 which defines one half of the connecting means of the connecting member 17.

It will be apparent from reviewing FIGS. 3 through 5 that the first step in interconnection of the tubular member 8 and the connecting member 7 is to close the central body section 17 by moving the shoulder section 21 toward the right in FIG. 2 while the flange 26 is moved as a unit toward the left in FIG. 2. Such movement is continued until edge portion 23 of shoulder section 21 and recess 33 of hinge section 32 are brought into close proximity with each other, as seen in FIG. 3. In such position, connecting member 7 substantially surrounds tubular member 8 for substantially its entire periphery.

The next step in interconnecting tubular member 8 and connecting member 7 is shown in FIG. 4. Lateral rotative movement of the flange 26 as a unit is continued until tooth edge 24 of flange section 28 is engaged with undercut shoulder portion 22. To complete the interlock, the flange sections 27 and 28 are rotatably distorted until they come into contact with each other and until they generally overly and contact that portion of central body section 17 indicated by reference numeral 35 in FIGS. 4 and 5. Such continued rotative distortion of the flange sections 27 and 28 as a unit urges edge 24 of flange section 28 into secure engagement with undercut shoulder portion 22, which in turn urges edge portion 23 into secure engagement with recess 33, as seen in FIG. 5.

When the tubular member 8 and connecting member 7 are connected in the fashion seen in FIG. 5, it will be understood that separation thereof is virtually impossible without destruction of the connecting member 7.

Because the material from which the connecting member was formed preferably has a permanent set and distortability, a secure interlock is effected between the connecting member 7 and tubular member 8. In that connection, referring to FIGS. 4 and 5, it will be noted that the flange section 28 serves as as a rigid strut which urges tooth edge 24 into engagement with the undercut shoulder portion 22 while at the same time urging the edge portion 23 of shoulder section 21 into secure engagement with the undercut recess 33 of flange 26. Thus, a doubly secure strut type interlock is effected between cooperating shoulder and tooth sections of the means 19 which interconnects connecting member 7 around tubular member 8.

An alternate embodiment of this invention is illustrated in FIG. 6. In such embodiment, the principal improvements of this invention are employed but such improvements are incorporated into a connecting member 36 formed in two parts, rather than one part as described hereinbefore. Those two parts are designated 37 and 38 in FIG. 6.

It will be noted that parts 37 and 38 of connecting member 36 are generally mirror images of each other and that the same include shoulder and tooth connecting structure of the type described previously and identified by reference numeral 19 in FIGS. 2 through 5. The only difference between the connecting member 36 shown in FIG. 6 and connecting member 7 described previously is the fact that connecting member 36 requires a duplication of the interconnecting procedure described previously as illustrated in FIGS. 2 through 5.

In that regard, it is preferred to use mechanical means (not shown) for effecting the interconnection of the shoulder and tooth structure illustrated in FIGS. 2 through 5 and in FIG. 6 to ensure a secure and uniform interconnection therebetween, and as a result, a secure and uniform interconnection of the connecting members 7, 36 with the tubular member 8.

Figure 7:
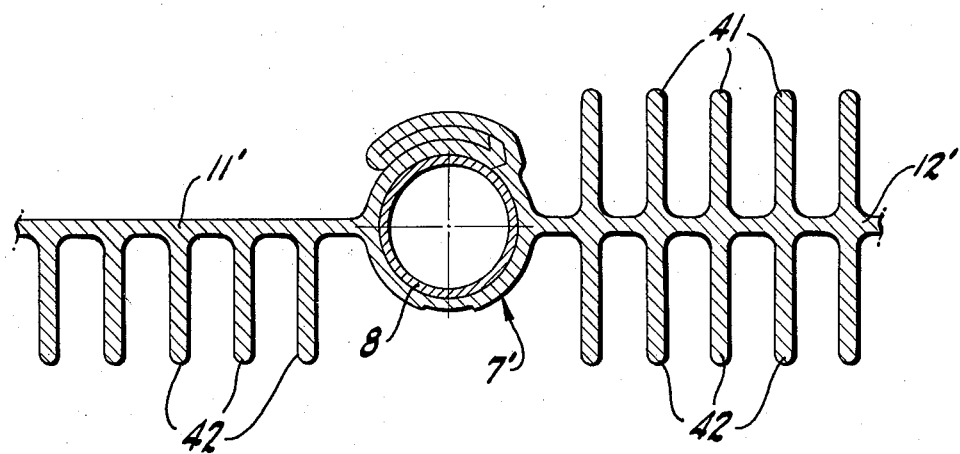
FIG. 7 is an end view of a further modification of the structural assembly in which the connecting member is formed selectively with projecting fins to enhance the solar energy absorbtion characteristics thereof when the structural assemblies are to be used as components in a solar energy absorbing panel structure.

Finally, reference is directed to FIG. 7 in which a further modification of connecting member 7' is illustrated. In most respects, connecting member 7' illustrated in FIG. 7 conforms to the connecting member 7 illustrated in FIGS. 2 through 5 and is assembled around the tubular member 8 in the same fashion. However, in the embodiment shown in FIG. 7, projecting fins 41 and 42 are formed integrally with and define part of the opposed plate sections 11' and 12' of connecting member 7'. By way of illustration, fins 41, 42 may project upwardly from one or both of the plate sections 11' and 12' and are spaced to extend therealong.

It should be understood that the fins 41 and 42 are provided to further enhance the absorbtion of solar energy by the plate sections of connecting member 7'. To that end, the fins 41, 42 also may be covered with a dark colored paint or other absorbtion enhancing material in known fashion.

Having thus made a full disclosure of a preferred embodiment of the structural assembly joint and method of forming the same, and of a preferred embodiment of a solar energy absorber panel structure producable by using a plurality of structural assemblies of this invention, reference is directed to the appended claims for the scope of protection to be afforded thereto.

What is claimed is:

1. A structural assembly comprising an elongated preformed connecting member and an elongated tubular member to be integrally connected in surrounding and contacting relationship by said connecting member without requiring separate fastening means for effecting such connection; said connecting member and said tubular member being generally co-extensive in the direction longitudinally of said tubular member; said connecting member including an initially expanded preformed partially closed central body section to receive said tubular member therein, said body section being defined by at least one deformable section and elongated generally non-deformable plate sections extending laterally in generally opposite directions from and integrally connected with said central body section; said one deformable section including locking means defined by interengageable preformed shoulder and tooth structure including compatibly contoured edge and recess sections deformable into strut like locking engagement with each other to close and draw said body section of said connecting member around said tubular member generally in close conforming contact with said tubular member about the full periphery of said tubular member in gap-free contacting relationship with said tubular member for substantially its entire length.

2. The structural assembly of claim 1 in which said deformable shoulder and tooth structure is further defined by a generally reversely directed shoulder section defining one edge of said structure and a reversely bent locking flange section which terminates in a locking tooth contoured generally in accordance with the internal contour of said shoulder section; said locking tooth being engageable with said shoulder section when said locking flange section is deformed to overlie said shoulder section to draw said shoulder and tooth structure closed and locked around said tubular member.

3. The structural assembly of claim 1 in which a section of said connecting member generally opposite said deformable section includes a reduced thickness portion which serves as a bendable hinge when said shoulder and tooth structure is deformably interconnected.

4. The structural assembly of claim 1 in which said connecting member is originally preformed in two parts, and in which a section of said connectng member generally opposite said first mentioned deformable section is defined by a second deformable section comprising a second deformable shoulder and tooth structure to complete the configuration of said connecting member when said connecting member is deformed around said tubular member.

5. The structural assembly of claim 4 in which said shoulder and tooth structures of said first and second opposed deformable sections are substantially identical mirror images of each other.

6. A structural assembly comprising an elongated preformed connecting member and an elongated tubular member to be integrally connected in surrounding and contacting relationship by said connecting member without requiring separate fastening means for effecting such connection; said connecting member and said tubular member being generally co-extensive; said connecting member including an initially expanded preformed partially closed central body section to receive said tubular member therein, said body section being defined by at least one deformable section, and elongated plate sections extending laterally in generally opposite directions from and integrally connected with said central body section, said elongated plate sections including preformed means at the marginal edges thereof for interconnecting said plate sections with the plate sections of other similarly constructed connecting members to provide an elongated panel structure; said one deformable section of said connecting member including locking means defined by interengageable preformed shoulder and tooth structure deformable into strut like locking engagement with each other to close and draw said body section of said connecting member around said tubular member generally in close conforming contact with said tubular member about its periphery for substantially its entire length.

7. The structural assembly of claim 6 in which said means at the marginal edge of one of said plate sections comprises an enlarged rib extending at least part way along said marginal edge of said one plate section, and in which said means at the marginal edge of said other plate section comprises a slot extending along said marginal edge of said other plate section; said rib and slot of said last mentioned plate sections being interfittable respectively with a slot and rib of another connecting member similarly constructed to permit interconnection of said first and second mentioned connecting members with each other to define said panel structure.

8. The structural assembly of claim 7 in which each said tubular member is hollow to serve as a fluid conduit, and in which said first mentioned and second mentioned connecting members, when interconnected as described, form part of an elongated solar energy absorber panel structure in which said plate sections of said connecting members serve as solar energy absorber plates and in which said tubular members received within said connecting members serve as conduits for fluid to be heated by the solar energy collected by said absorber plates.

9. The structural assembly of claim 8 in which said plate sections of at least some of said connecting members include fins projecting therefrom to enhance the energy absorbtion capability thereof.

10. A method of forming a structure assembly defined by a tubular member and a connecting member which includes plate sections extending laterally generally in opposite directions from a central body section thereof; said method comprising providing a preformed elongated connecting member, and providing an elongated tubular member to be integrally connected in surrounding and contacting relationship by said connecting member without requiring separate fastening means for effecting such connection; inserting said tubular member within an initially expanded preformed central body section of said connecting member which includes at least one deformable section which includes locking means defined by interengageable preformed shoulder and tooth structure including interengageable preformed tooth and shoulder sections and other interengageable preformed edge and recess sections, and deforming said tooth and shoulder sections of said shoulder and tooth structure into strut like locking engagement with each other to progressively close said connecting member to urge said edge and recess sections into intimate contact with each other to thereby draw said connecting member completely around said tubular member into generally close gap-free conforming contact with said tubular member about its periphery for substantially its full length.

11. The structural assembly method of claim 10 in which said deformable tooth and shoulder structure is further defined by a generally reversely directed shoulder section defining one end of said structure and a reversely bent locking flange section with terminates in a locking tooth contoured generally in accordance with the contour of said shoulder; said locking tooth being moved into engagement with said shoulder section and said flange section being deformed to overlie said shoulder section to draw said shoulder and tooth structure closed and locked around said tubular member with said preformed edge and recess sections engaged with each other.

12. A solar energy absorber panel structure comprising a plurality of interconnected structural assemblies, each of said structural assemblies comprising an elongated preformed deformable connecting member and an elongated hollow tubular member clamped within said connecting member and serving as a conduit for fluid to be heated by solar energy absorbed by said panel structure; said connecting member and said tubular member being generally co-extensive; each said connecting member including locking means defined by interlocked deformable shoulder and tooth structure deformed into strut like surrounding locking engagement with and securely holding a central body section of said connecting member around said tubular member in substantially peripherally continuous heat transmitting engagement therewith for substantially the full length of said tubular member, and plate sections extending laterally from said central body section for absorbing solar energy to which said connecting member is exposed.

13. The panel structure of claim 12 in which said plate sections have marginal edges extending therealong, the marginal edge of a plate section of one connecting member being interconnected with a marginal edge of a plate section of an adjacent connecting member.

14. The panel structure of claim 13 in which said plate section marginal edges comprise preformed interfitted rib and slot means for rigidly interconnecting said plate sections into said panel structure.

15. The panel structure of claim 12 in which at least one of said plate sections includes fins projecting therefrom to enhance the solar energy absorbtion capability of such plate section.

16. The panel structure of claim 12 which includes a manifold pipe, and in which each said tubular member is operatively connected with said manifold pipe so that fluid heated in said tubular members may be transmitted through said manifold pipe toward the location for utilization of said heated fluid.

* * * * *